Figure 1:
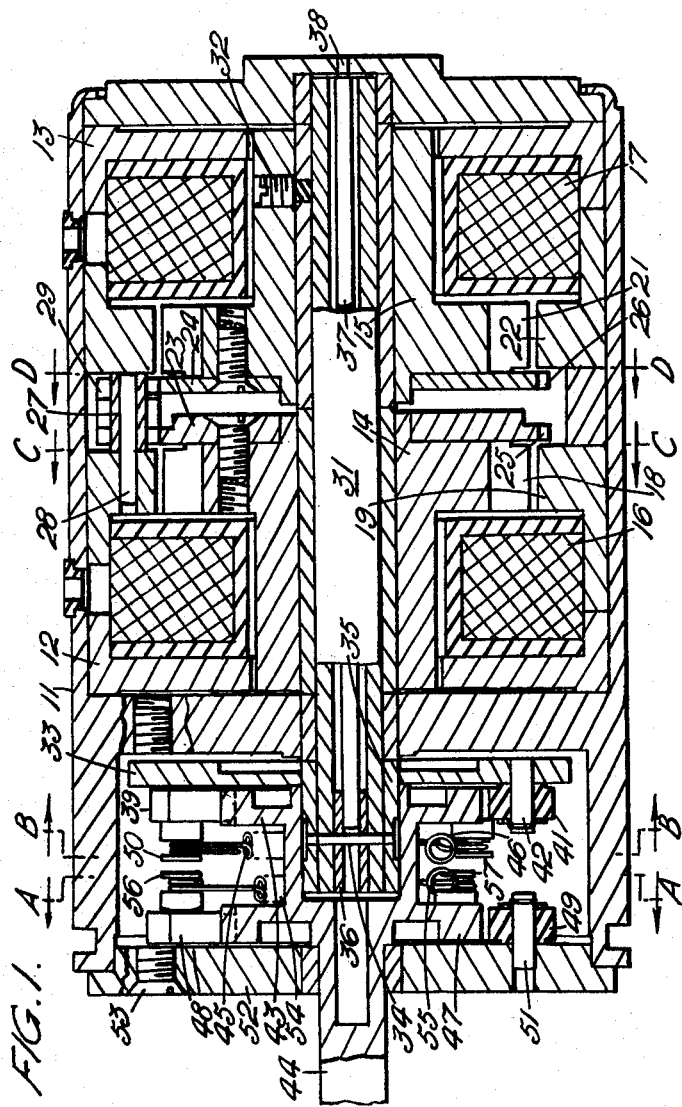

Aug. 4, 1964   G. V. BOND   3,143,674
ROTARY STEPPING MECHANISMS
Filed Nov. 24, 1961   3 Sheets-Sheet 1

INVENTOR
Gordon V. Bond

By Watson, Cole, Grindle & Watson
ATTORNEYS

Aug. 4, 1964     G. V. BOND     3,143,674
ROTARY STEPPING MECHANISMS
Filed Nov. 24, 1961     3 Sheets-Sheet 2
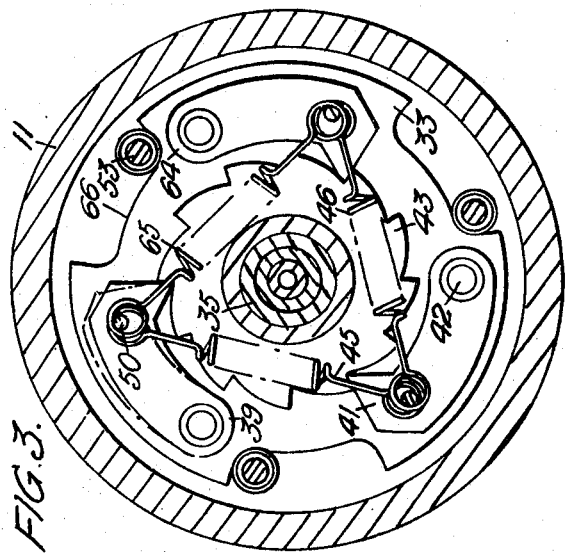
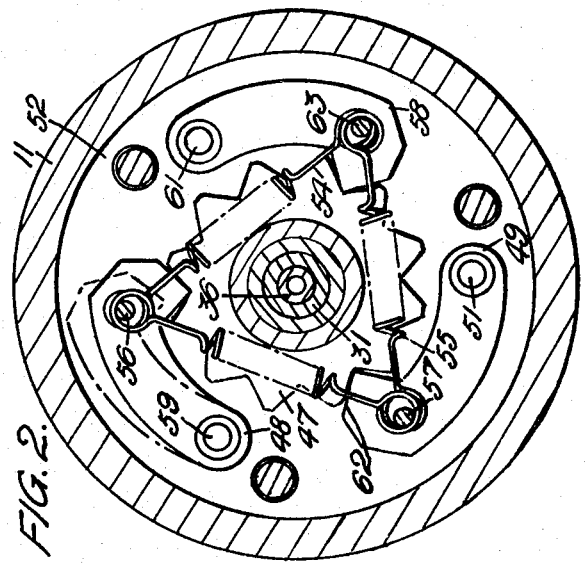
INVENTOR
Gordon V. Bond
By Watson, Cole, Grindle & Watson
ATTORNEYS Aug. 4, 1964
G. V. BOND
3,143,674
ROTARY STEPPING MECHANISMS
Filed Nov. 24, 1961
3 Sheets-Sheet 3
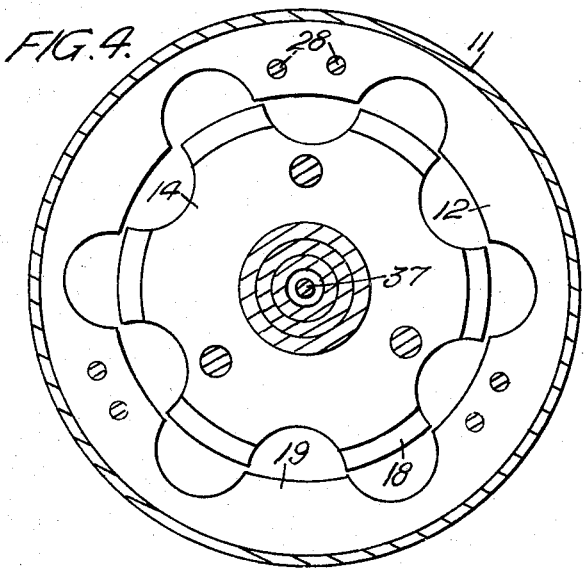
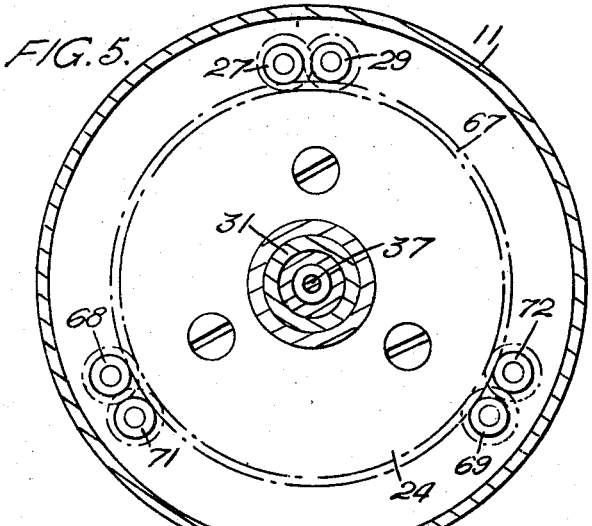
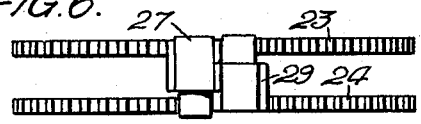
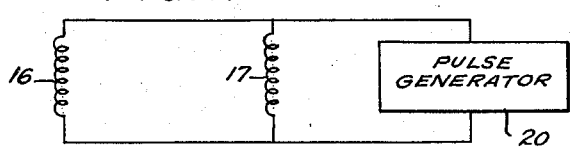
INVENTOR
Gordon V. Bond
By Watson, Cole, Grindle & Watson
ATTORNEYS

United States Patent Office 3,143,674
Patented Aug. 4, 1964

3,143,674
ROTARY STEPPING MECHANISMS
Gordon Vallance Bond, Bracknell, England, assignor to Microcell Limited, London, England, a British company
Filed Nov. 24, 1961, Ser. No. 154,717
Claims priority, application Great Britain Nov. 25, 1960
10 Claims. (Cl. 310—37)

This invention relates to rotary stepping mechanisms such as may be employed, for example, to operate a multi-position rotary switch.

According to one aspect of the invention a rotary stepping mechanism comprises two similar electro-magnetic rotor-stator assemblies arranged so that on energising the two assemblies with an electric current, the two rotors turn through limited angles in opposite directions, differential gearing connecting the two rotors so that their rotational movements are equal and opposite, restoring means coupled to one of the rotors to restore the rotors to a normal position on cessation of the energising current and a rotatable output member with a latching mechanism driven by a one-way drive from one of the rotors. This arrangement permits of the construction of a stepping mechanism which is substantially immune to linear or angular accelerations, vibration or shock.

The latching mechanism conveniently comprises two or more pawls evenly spaced about a toothed member, the pawls being spring-urged towards the toothed member. The pawls may be balanced about their centre of rotation to ensure that they are not affected by linear accelerations. Preferably three pawls are employed which are evenly spaced around the periphery of a toothed member, each pawl being linked by springs under tension to the other two pawls. The springs conveniently are helical tension springs and the three springs may be arranged in a triangular formation with the apices at anchorage points for the springs on the three pawls. With this construction if, due to any external acceleration, one of the pawls should tend to lift, it will pull on two springs to pull the other two pawls into tighter engagement with the toothed member.

The aforementioned one-way drive conveniently comprises a driving member carrying three or more pawls evenly spaced about a ratchet wheel, the pawls being spring urged towards the wheel. Preferably three pawls are employed each being linked by springs under tension to the other two pawls as in the latching mechanism described above.

Preferably the stator of each rotor-stator assembly contains the coil for energising the assembly, each rotor comprising a shaped magnetic member having salient poles which when the respective coil is energised, move into alignment with corresponding poles salient on the respective stator.

The differential gearing between the two rotors preferably comprises two externally toothed wheels of similar diameter mounted respectively on the two rotors and coaxially arranged and a pair of pinions, each pinion meshing with one of the two wheels and with the other pinion, and being carried on the stator assembly on shafts parallel to but displaced from the rotor axis. This differential gearing ensures that any rotational movement of one rotor is accompanied by an equal and opposite rotational movement of the other rotor.

The following is a description of a specific embodiment of the invention in which reference will be made to the accompanying drawing, of which:

FIGURE 1 is a sectional elevation of a rotary stepping mechanism according to the invention, FIGURE 2 is an elevation of the latching mechanism employed in the mechanism of FIGURE 1, FIGURE 3 is an elevation of the one-way drive mechanism employed in the mechanism of FIGURE 1, FIGURE 4 is an elevation of one of the electro-magnetic rotor-stator assemblies of the mechanism of FIGURE 1, FIGURE 5 is an elevation of the differential gearing employed in the mechanism of FIGURE 1, FIGURE 6 is a plan view of part of the differential gearing of FIGURE 5, and FIGURE 7 is a diagrammatic view of the circuit for energizing the coils of the rotor-stator assemblies.

FIGURE 1 shows a rotary stepping mechanism having a cylindrical outer casing 11 to the inside of which are attached stators 12 and 13 of respectively first and second electro-magnetic rotor-stator assemblies, the rotors of which are shown at 14 and 15 respectively. The first assembly is energised by a coil 16 and the second by a coil 17, the passage of current through these coils giving rise to rotation of the rotors as a result of attraction between poles salient upon the rotors and stators. These poles are evenly spaced around the rotor-stator assemblies; rotor and stator poles for the first assembly are shown at 18 and 19 respectively and for the second assembly at 21 and 22.

As shown in FIGURE 7, the coils 16 and 17 are connected in parallel to a pulse generator 20 which generates pulses to energize the coils.

In the normal quiescent condition the relative positions of the poles are arranged to be such that on simultaneous energisation of the two coils the two rotors tend to move in opposite directions to an equal extent. That the movements of the rotors are in fact equal and in opposite directions is ensured by the provision of differential gearing between the two rotors. Annular nylon discs 23, 24 having external gear teeth 25, 26 respectively are attached by screws to rotors 14 and 15 respectively. Teeth 25 mesh with the teeth of three steel pinions the axes of which are parallel to the co-linear axes of the rotors 14, 15. The steel pinions rotate upon shafts fixed to the stator assemblies; one of the pinions is shown at 27 with its shaft 28. Teeth 26 mesh with the teeth of a similar set of pinions one of which is shown at 29. The operation of the differential gearing will be described in greater detail with reference to FIGURES 5 and 6.

A hollow shaft 31 is provided for transmitting drive from the rotor-stator assemblies. Rotor 15 is fixed relative to shaft 31 by means of grub-screws, one of which is shown at 32. Shaft 31 passes freely through rotor 14, this rotor imparting rotation to the shaft solely through the differential gearing and thence through rotor 15. One end of shaft 31 carries a plate 33 which is fixed to rotate with the shaft by virtue of a pin 34 linking a cylindrical extension 35 of the plate with the shaft.

Pin 34 also engages a collar 36 which is attached to a torsion bar 37 which passes down the centre of the hollow shaft 31 and is fixed relative to the casing 11 by a square key 38. The torsion bar 37 acts as a return spring to the rotors 14, 15 by exerting a restoring torque when they have been displaced by energisation of the coils 16, 17. Thus through the agency of torsion bar 37 the rotors return to their quiescent positions on de-energisation of the coils 16, 17.

Plate 33 carries three pawls, two of which are shown at 39 and 41. The pawls are mounted on shafts such as that shown at 42 to be rotatable relative to the plate 33. The pawls engage ratchet teeth cut in the external circumference of a ratchet wheel 43. Ratchet wheel 43 is integral with an output drive shaft 44 from which the output of the mechanism is taken. The output drive shaft 44 may be used to drive any mechanism requiring a rotary stepped drive, such as for example a multi-position switch. The pawl and ratchet device provides a one-way drive from shaft 31 to output shaft 44, the drive being transmitted only when shaft 31 rotates on energisation of coils 16, 17 and not when it rotates in the opposite direction under the restoring action of torsion bar 37. The three pawls are held in resilient contact with the teeth of the ratchet wheel 43 by a triangular configuration of three helical tension springs, two of which are shown at 45 and 46. The apices of the triangle are constituted by anchorage pins such as that shown at 50, one pin being on each of the pawls.

Formed integrally with ratchet wheel 43 and output shaft 44 is a latch wheel 47 having twelve teeth. The teeth of this wheel differ from those of the ratchet wheel in that each tooth is symmetrical. The teeth of latch wheel 47 are engaged by three pawls, two of which are shown at 48 and 49. These pawls are pivotally mounted on shafts such as that shown at 51 which are set into a circular plate 52 which is attached by three screws, one of which is shown at 53, to form one end of the casing 11. The three pawls associated with latch wheel 47 are held in contact with the teeth of the latch wheel by a triangular configuration of springs similar to that used for the ratchet mechanism. Two of the springs 54 and 55 are shown anchored to pins 56 and 57 on pawls 48 and 49 respectively.

FIGURE 2 is a section taken at "A—A" of FIGURE 1. Pawls 48, 49, 58 pivot about shafts 59, 51, 61 respectively, the shafts being set in plate 52 which is fixed relative to the casing 11. The pawls are held in engagement with the latch wheel 47 by three springs 54, 55, 62 anchored to pins 56, 57, 63. This arrangement has the advantage that if one of the pawls is subjected to a force tending to pull it out of engagement with the teeth of latch wheel 47 then spring tension exerts forces on the other two pawls to bring them into firmer engagement with the latch wheel. Thus there is little risk of the latch wheel becoming free to move even under extreme conditions of shock or vibration.

The function of the latching device shown in FIGURE 2 is to ensure that each step of motion obtained at the output shaft 44 is an exact angular distance, in this case 30°. It is advantageous to arrange that, for a six pole rotor-stator assembly, the electromotive force for each step is applied over only approximately 26°. With this arrangement the remaining 4° of movement are provided by the pressure of the latching pawls upon the sloping faces of the teeth of the latch wheel 47.

FIGURE 3 is a section taken at "B—B" of FIGURE 1 and shows the ratchet mechanism of the one-way drive device. Pawls 39, 41, 64 engage with the teeth of ratchet wheel 43 and are resiliently held in engagement by a triangular spring configuration comprising springs 45, 46, 65 in a similar manner to that described in relation to the latching device. The advantages with regard to immunity from shock and vibration apply to the ratchet device also.

The ratchet device is shown in the quiescent condition. When coils 16, 17 (FIGURE 1) are energised member 35 rotates in a clock-wise direction, so carrying plate 33 also in a clock-wise direction. The pawls and spring assembly move bodily with plate 33 and in doing so engage with the teeth of ratchet wheel 43 and rotate the wheel in a clock-wise direction. The extent of the movement of the plate 33 and the pawls is approximately 26°, but when the movement has exceeded about 20° the ratchet wheel 43 is carried forward to complete the full 30° step by the action of the latching mechanism, the ratchet wheel 43 and the latch wheel 47 being formed integrally. When coils 16, 17 (FIGURE 1) are deenergised plate 33 and the pawls return to the quiescent position under the spring action of the torsion bar 37 (FIGURE 1). The ratchet wheel 43 however remains in its new position, being restrained from moving under the slight frictional force of the returning pawls by the latching device. In returning the pawls engage the next teeth of the ratchet wheel. Movement of plate 33 is limited by three recesses therein which engage with the screws fixing plate 43 to the casing 11. For example recess 65 is shown in engagement with screw 53.

FIGURE 4 is a section taken at "C—C" of FIGURE 1 and shows the arrangement of the aforesaid first rotor-stator assembly. The rotor 14 and the stator 12 both have six salient poles such as those shown at 18, 19. The assembly is shown in the quiescent position. When coils 16, 17 (FIGURE 1) are energised the poles of the rotor and stator tend to move into alignment and thus the rotor is moved in a clock-wise direction. In the quiescent position the poles of the rotor are arranged not to be exactly half-way between two poles of the stator since if this were the case the attraction of each for the rotor poles by each of the two stator poles would be equal and opposite and the rotor would not move one way or the other. In the quiescent position the poles of rotor 14 are therefore disposed slightly in a clock-wise direction from the centre poistion. A convenient distance for this purpose is about 4°. On this account the total movement available by the electromagnetic stepping mechanism is 26° and the remaining 4° is provided to the output shaft by the latching means as described above. The clock-wise movement of rotor 14 is transmitted through differential gearing to the rotor 15 (FIGURE 1) and thence to shaft 31.

FIGURE 5 is a section taken at "D—D" of FIGURE 1 and shows the differential gearing employed. Disc 24 is an annular disc of moulded nylon formed with gear teeth on its outer circumference 67. These gear teeth mesh with the teeth on three steel pinions 29, 68, 69 spaced evenly around the circumference of the disc with their axes of rotation fixed relative to the casing 11 and parallel, but not colinear with the axis of shaft 31. A similar toothed nylon disc on rotor 14 meshes with pinions 27, 71, 72 these pinions also meshing with pinions 29, 68, 69 respectively. FIGURE 6 is a plan view of the mechanism of FIGURE 5 and shows the method of co-operation of the pinions between themselves and their respective nylon discs. This arrangement ensures that the movements of the two rotors are equal and in opposite directions.

A rotary stepping mechanism as described above has the advantage that in its operation it is relatively immune to linear or angular accelerations, vibration or shock. As far as possible the movable components of the mechanism are evenly distributed around the axis of the device. Thus torques about the axis of the device induced by the inertia of the moving parts when the mechanism is subjected to a linear acceleration are effectively balanced and the resultant torque inducing rotation of the output drive shaft 44 is substantially zero.

The arrangement whereby the two rotors 14, 15 of equal inertia are interconnected through differential gearing to move in equal distances in opposite directions provides freedom from inertial effects of the rotors when the mechanism is subjected to angular acceleration. When the mechanism is subjected to an angular acceleration the inertia of the rotors gives rise to torques tending to produce relative angular movement between the rotors and the casing of the mechanism. The directions in which the two rotors tend to move are the same but because of the differential gearing the effects of such tendencies on the drive shaft 31 and thus on the output shaft 44 are equal and opposite and the rotational effects of the two rotors upon the output of the mechanism are balanced. The inertial effects of the shafts 31, 44 and the associated moving parts of the ratchet and latching mechanisms remain but these are reduced to a minimum by the use of light-weight components. The effect of the inertia of these components on rotation of the output drive shaft 44 is further reduced by the latching mechanism, the triangular spring configuration of which renders it relatively immune to acceleration, as described in connection with FIGURE 2.

In the operation of the mechanism under conditions of angular acceleration the two rotors 14, 15 are arranged, on energisation of the respective coils 16, 17, to move in opposite directions. Thus the amount of hindrance one rotor receives in moving is exactly balanced by the amount of aid the other rotor receives, so that the combination behaves as if there were no angular acceleration applied. The amount of torque applied by the rotors to drive shaft 31 is therefore constant irrespective of the angular acceleration of the device and there is no chance of the mechanism failing to step correctly.

Particular application of the mechanism may be found in environments where a rotary stepping mechanism is required to operate under conditions of extreme linear or angular accelerations, shock or vibration; such environments as are found for example in high speed aircraft or missiles.

The invention is not restricted to the details in the foregoing description of a specific embodiment, which is included by way of example only.

I claim:

1. A rotary stepping mechanism comprising two similar co-axial electro-magnetic rotor-stator assemblies arranged so that on energising the two assemblies with an electric current the two rotors turn through limited angles in opposite directions, differential gearing connecting the two rotors so that their rotational movements are equal and opposite, restoring means coupled to one of the rotors to restore the rotors to a normal position on cessation of the energising current and a rotatable output member with a latching mechanism driven by a one-way drive from one of the rotors.

2. A rotary stepping mechanism as claimed in claim 1 wherein the latching mechanism comprises two or more pawls evenly spaced about a toothed member, and resilient means for linking the pawls to one another and for urging the pawls towards the toothed member.

3. A rotary stepping mechanism as claimed in claim 2 wherein the latching mechanism comprises three pawls and three helical tension springs, the springs being arranged in a triangular formation with the apices at anchorage points for the springs on the three pawls.

4. A rotary stepping mechanism as claimed in claim 1 wherein the one-way drive comprises a driving member carrying two or more pawls evenly spaced about a ratchet wheel, and resilient means for linking the pawls to one another and for urging the pawls towards the toothed member.

5. A rotary stepping mechanism as claimed in claim 4 wherein the one-way drive comprises three pawls and three helical tension springs, the springs being arranged in a triangular formation wtih the apices at anchorage points for the springs on the three pawls.

6. A rotary stepping mechanism as claimed in claim 1 wherein the two rotor-stator assemblies are arranged with the rotor of one secured to a hollow shaft extending through the two assemblies and the rotor of the other being freely rotatable on this shaft, one end of the shaft being arranged to drive the one-way drive.

7. A rotary stepping mechanism as claimed in claim 6 wherein the restoring means comprises a torsion spring arranged within the hollow shaft.

8. A rotary stepping mechanism as claimed in claim 1 wherein the stator of each rotor-stator assembly contains a coil for energising the assembly, each rotor comprising a shaped magnetic member having salient poles which, when the respective coil is energised, move into alignment with corresponding poles salient on the respective stator.

9. A rotary stepping mechanism as claimed in claim 1 wherein the differential gearing connecting the two rotors comprises two externally toothed wheels of similar diameter mounted one on each of the two rotors and coaxially arranged and a pair of pinions, each pinion meshing with one of the two toothed wheels and with the other pinion and being carried on the stator assembly on shafts parallel to but displaced from the rotor axis.

10. A rotary stepping mechanism as claimed in claim 9 wherein there are provided three pairs of pinions evenly distributed around the circumference of the toothed wheels.

References Cited in the file of this patent

UNITED STATES PATENTS

| | | |
|---|---|---|
| 2,069,991 | Blanchard | Feb. 9, 1937 |
| 2,706,259 | White | Apr. 12, 1955 |